(12) United States Patent
Jang et al.

(10) Patent No.: US 6,198,508 B1
(45) Date of Patent: Mar. 6, 2001

(54) METHOD OF ENCODING PICTURE DATA AND APPARATUS THEREFOR

(75) Inventors: Euee-seon Jang, Sungnam; Se-hoon Son; Jae-seob Shin, both of Seoul, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/961,949

(22) Filed: Oct. 31, 1997

(30) Foreign Application Priority Data

Nov. 1, 1996 (KR) .................................................. 96-52066
Dec. 17, 1996 (KR) .................................................. 96-66937
Jan. 23, 1997 (KR) .................................................. 97-1908

(51) Int. Cl.[7] ...................................................... H04N 7/12
(52) U.S. Cl. ................................... 348/391.1; 358/261.1
(58) Field of Search ................................... 348/391, 390, 348/384, 236; 382/241, 243, 137; 358/261.1, 261.2, 430, 431, 447, 428, 260

(56) References Cited

U.S. PATENT DOCUMENTS

| | | |
|---|---|---|
| 4,316,222 | 2/1982 | Subramaniam . |
| 4,673,987 * | 6/1987 | Toyokawa ............................ 358/260 |
| 4,682,215 * | 7/1987 | Adachi .................................. 358/75 |
| 4,893,187 * | 1/1990 | Tsujimoto et al. ................. 358/261.1 |
| 5,134,389 * | 7/1992 | Furuta et al. ......................... 340/707 |
| 5,264,942 * | 11/1993 | Shimotsuji et al. ............... 358/261.1 |
| 5,274,462 * | 12/1993 | Satoh .................................... 358/428 |
| 5,319,463 * | 6/1994 | Hongu et al. ...................... 358/261.1 |
| 5,337,159 * | 8/1994 | Iidat et al. ............................ 358/447 |
| 5,438,188 * | 8/1995 | Surka .................................... 235/462 |
| 5,706,096 * | 1/1998 | Koike ................................. 358/261.2 |
| 5,740,271 * | 4/1998 | Kunkler et al. ...................... 382/137 |
| 5,828,786 * | 10/1998 | Rao et al. ............................. 382/236 |
| 5,883,678 * | 3/1999 | Yamaguchi et al. ................. 348/390 |

FOREIGN PATENT DOCUMENTS 2 127 644    8/1983   (GB) .

* cited by examiner

*Primary Examiner*—Chris S. Kelley
*Assistant Examiner*—Tung Vo
(74) *Attorney, Agent, or Firm*—Burns, Doane, Swecker & Mathis, L.L.P.

(57) ABSTRACT

A method for encoding picture data using scan interleaving pixels and an apparatus and method for encoding the picture data includes the steps of determining whether pixels of a present scanning line in a predetermined frame of an image should be encoded according to comparison results between pixels of a previous scanning line and pixels of a next scanning line and between pixels of a previous or next scanning line and pixels of the current scanning line, and encoding pixels of lines of the image excluding pixels that are determined to not be encoded.

15 Claims, 9 Drawing Sheets

| P1 | P2 | P3 |
|----|----|----|
| P4 | Pxy |   |
| P5 |    | P6 |

TYPE+RUN OF TYPE+SEGMENT LENGTH ← 1320
F[0,0,0,1,1,0]+0+7 ← 1330

METHOD OF ENCODING PICTURE DATA AND APPARATUS THEREFOR

BACKGROUND OF THE INVENTION

1. Field of the Invention

The present invention relates to a method of encoding data and an apparatus therefor, and more particularly, to a method of encoding picture data of a current line to be scanned using pixels of previous and next lines in a picture and an apparatus therefor.

2. Description of the Related Art

FIG. 1 is a block diagram showing the structure of a conventional shape encoder. As shown in FIG. 1, the shape of an input image is encoded as a bitstream through a shape encoder 11 and is displayed as an encoded bitstream 13. The shape encoder 11 encodes the encoded bitstream 13 and a Shape Decoder 15 provides a reconstructed image.

In the conventional shape encoder, a greater number of encoded bits are required for resolution control and picture quality than in the case of performing encoding without such control. Accordingly, the encoding system becomes more complicated and becomes a burden on encoding. This is true of communication circumstances such as radio communication in which additional multiple functions such as functions of controlling resolution and picture quality, encoding which is resistant to transfer errors, and controlling a transfer rate, are employed.

SUMMARY OF THE INVENTION

It is an object of the present invention to provide a method for encoding picture data in which pixel information of scanned lines in a binary image are encoded dependent upon comparison results between pixels of a previous scanning line and pixels of a current scanning line and between pixels of a next scanning line and pixels of the current scanning line.

To achieve the above object, there is provided a method for encoding an image according to the present invention, comprising the steps of determining whether pixels of a present scanning line in a predetermined frame of an image sequence should be encoded according to comparison results between pixels of a previous scanning line and pixels of a next scanning line and between pixel of a previous or next scanning line and pixel of the current scanning line, and encoding pixels of lines of the frame excluding pixels that are determined not to be encoded.

The pixels are determined to be different from each other by performing an exclusive-OR operation.

The step of determining the difference between pixels comprises the steps of dividing picture data into data of a scan interleaving pattern in a predetermined frame of an image sequence, and performing an exclusive-OR operation with respect to the respective pixels of the previous and next scanning lines of the current scanning line in said frame, wherein said step of encoding the image comprises the steps of generating previous and next scanning line information of said current scanning line, the resultant value (exclusive-OR information) of the exclusive-OR operation between the pixel of previous scan line and the pixel of next scan line corresponding to each pixel of said current scanning line, and the case-exception information of the current scanning line, which mean the pixel value of said current scanning line is different from the pixel value of previous or next scanning line, though the pixel values of the previous and next scanning lines of which are the same, and encoding the previous and next scanning line information of said generated current scanning line which forms a bitstream and encoding the pixel which is included in exclusive-OR information and case-exception information, and combining the same with said formed two bitstreams, to thereby form the complete bitstream.

The exclusive-OR operation is performed by replacing the next scanning line with the previous scanning line in the case that the current scanning line corresponds to the last scanning line in the frame.

The step of performing the exclusive-OR operation and the step of generating data are performed at least once with respect to the previous and next scanning lines by inputting the previous and next scanning line information of the current scanning line in order to process multi-level scanning lines.

Encoding of the pixel which is included in the exclusive-OR information of said step of forming a bitstream comprises the steps of obtaining the run-length of the pixels from successive exclusive-OR data which have the same value of current encoded pixel, and encoding said obtained run-length using a predetermined entropy encoding method.

The encoding of the exclusive-OR information in the step of forming the bitstream comprises the steps of obtaining a pixel context characteristic value determined according to a predetermined peripheral pixel value with respect to the pixels except for the pixel corresponding to the exclusive-OR information among the pixels of the scanning lines including the exclusive-OR information and the case-exception information among the scanning lines divided in the step of dividing the scanning line, mapping the obtained pixel context characteristic value by an established probability model value, and encoding the value mapped by the probability model value by a predetermined entropy encoding method.

The encoding of the case-exception information in the step of forming the bitstream comprises the steps of obtaining the pixel context characteristic value determined according to a predetermined pixel value with respect to each pixel except for the pixel corresponding to the exclusive-OR information among the pixels of the interleaved scanning lines including the exclusive-OR information and the case-exception information among the scanning lines divided in the step of dividing the interleaved scanning lines, one-dimensionally reconstructing the obtained pixel context characteristic value, extracting the pixel context characteristic value of the case-exception information pixel to be encoded, obtaining the number of appearances of the value equal to the extracted pixel context characteristic value between the case-exception information pixel to be encoded and the previously encoded case-exception information pixel, and encoding the said extracted pixel context characteristic value and the obtained number by a predetermined entropy encoding method.

Encoding of the case-exception information in said step of forming the bitstream comprises the steps of dividing pixels except for the pixel corresponding to said exclusive-OR information among the pixels of the interleaved scanning lines including said exclusive-OR information and said case-exception information among the interleaved scanning lines divided in said step of dividing the interleaved scanning lines in successive case-exception information segment unit, obtaining the pixel context characteristic value determined according to a predetermined peripheral pixel value with respect to the first pixel of said segment, one-dimensionally reconstructing said obtained pixel context characteristic value and the length of the segment which include said obtained pixel for each segment in a segment unit, obtaining the number of appearances of the value equal to said obtained pixel (the first pixel of each segment) context characteristic value between the case-exception information pixel to be encoded and the previously encoded case-exception information pixel, and encoding said obtained pixel context characteristic value, said obtained number and said obtained length of the segment which include said obtained pixel as first pixel by a predetermined entropy encoding method.

The method for encoding picture data further comprises a lossy coding step of selecting information to be coded or information not to be coded by the segment length and the step of measuring the number of generated information or the number of generated bits and determining the order in which the scan interleaving method is to be applied on the basis of number.

The scanning interleaving method can be applied to the picture data which is given after previous scanning interleaving method.

To achieve the above object, there is provided an apparatus for encoding picture data, comprising a scan analyser for analysing a current scanning line using the exclusive-OR with respect to the pixel of the concerned line of the previous and next scanning lines of the pixel of the concerned line of the current scanning line in a predetermined frame of an input picture, forming the previous and next scanning line information of said present scanning line, the pixel value selected by said exclusive-OR operation, the pixel value excluded from said exclusive-OR operation, and the pixel value of case-exception information, and repeatedly performing the scan analysis with respect to the previous and next scanning lines of said current scanning line as much as the concerned number of stages, an encoder for encoding the previous and next scanning line information of said finally generated current scanning line after performing the scan analysis as much as said concerned number of stages and forming it as a bitstream and joining the bitstream of the pixel selected by said exclusive-OR operation generated in each difference and the pixel excluded from said case-exception operation to said bitstream, a decoder for decoding a bitstream output from said encoder, and a scan synthesizer for performing the processes of reconstructing the previous and next scanning line information of current stage using one stage lower decoded picture and then the current scan line of current stage can be given from the exclusive-OR information and case-exception information which are decoded form the bitstream, and this mechanism can be structured recursively, ie, this current stage can be used as the one stage lower decoded stage for reconstructing next stage.

BRIEF DESCRIPTION OF THE DRAWING(S)

The above object and advantages of the present invention will become more apparent by describing in detail a preferred embodiment thereof with reference to the attached drawings in which.

Figure 7:
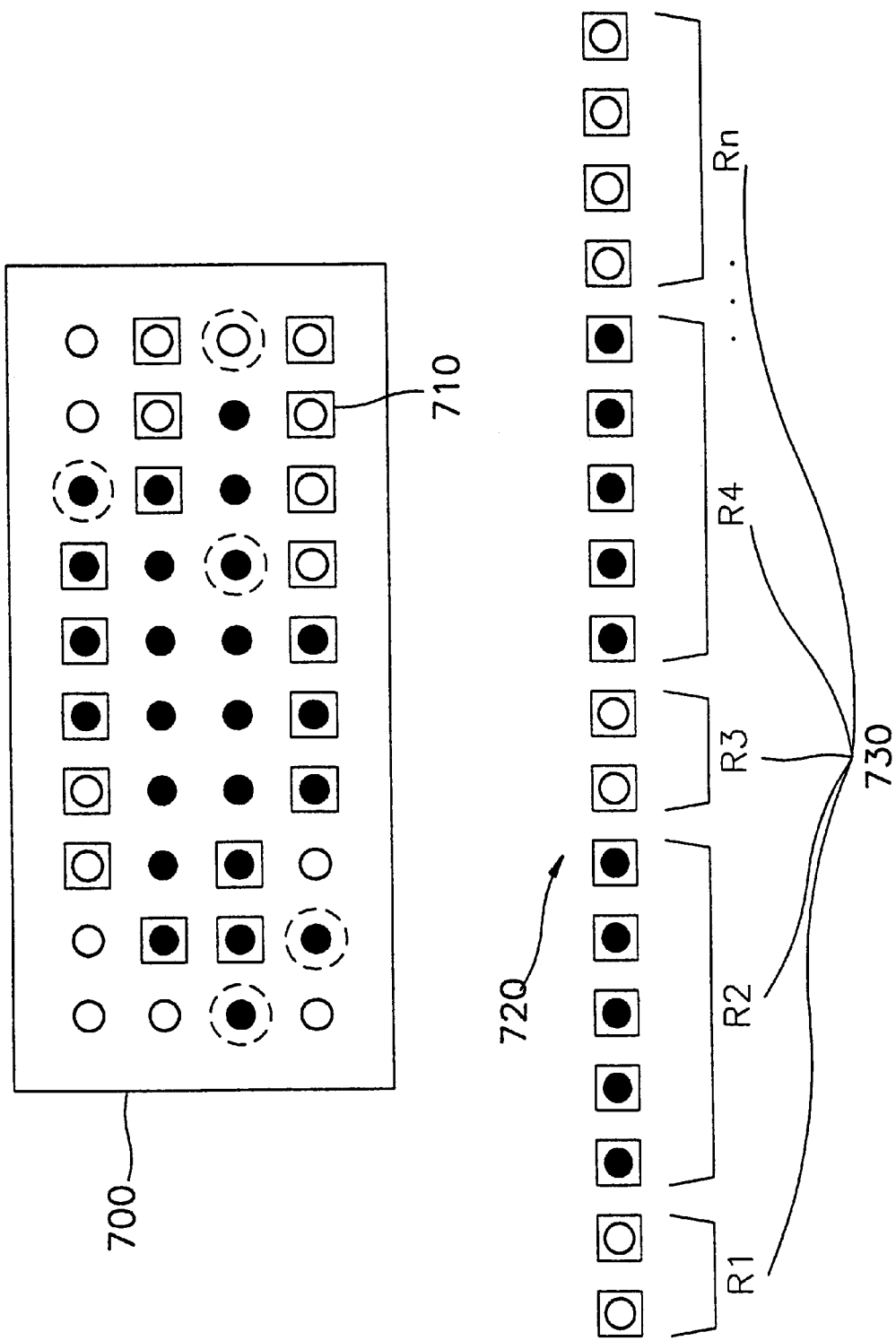
Figure 8:
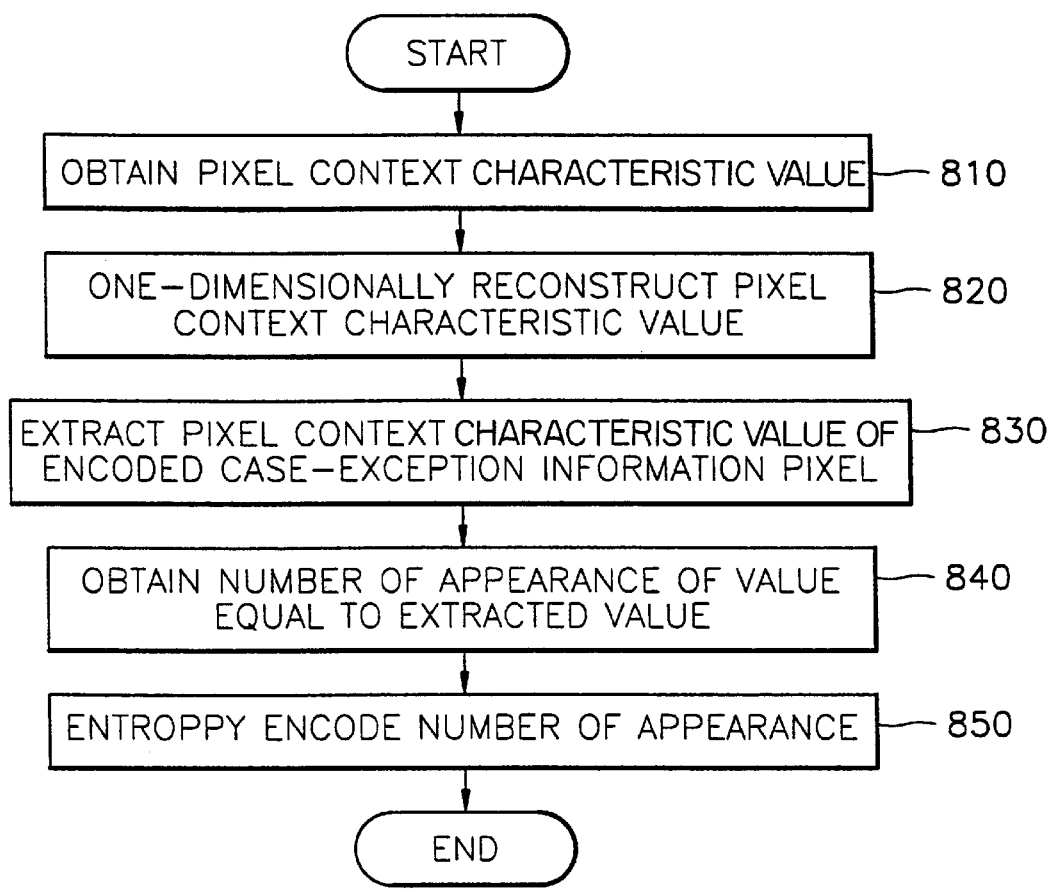
Figure 9:
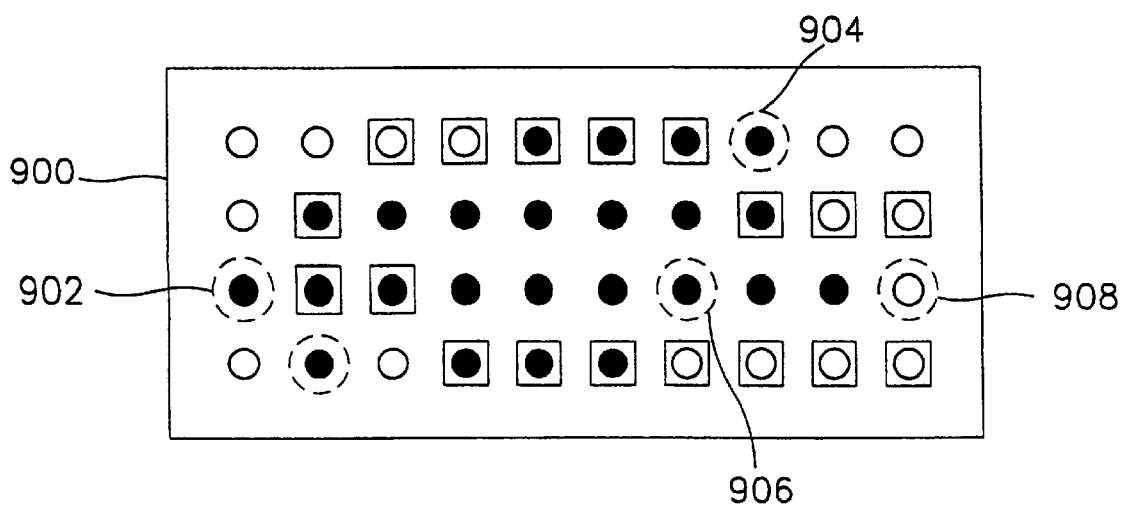
Figures 10, 11, 12:
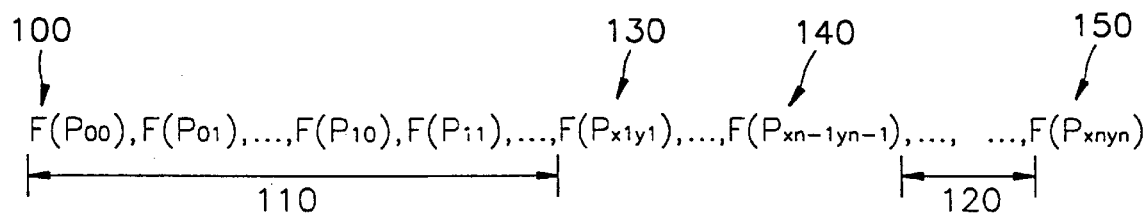
Figure 13:
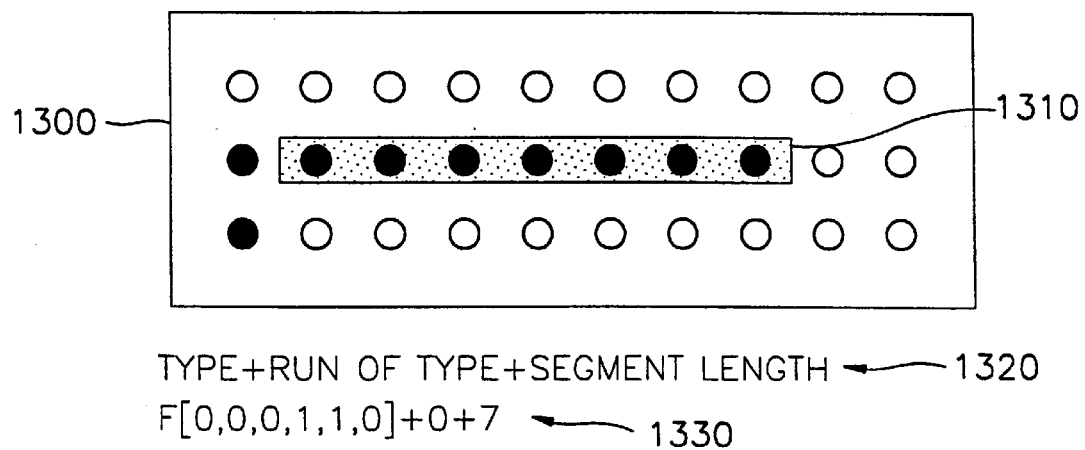
Figure 14:
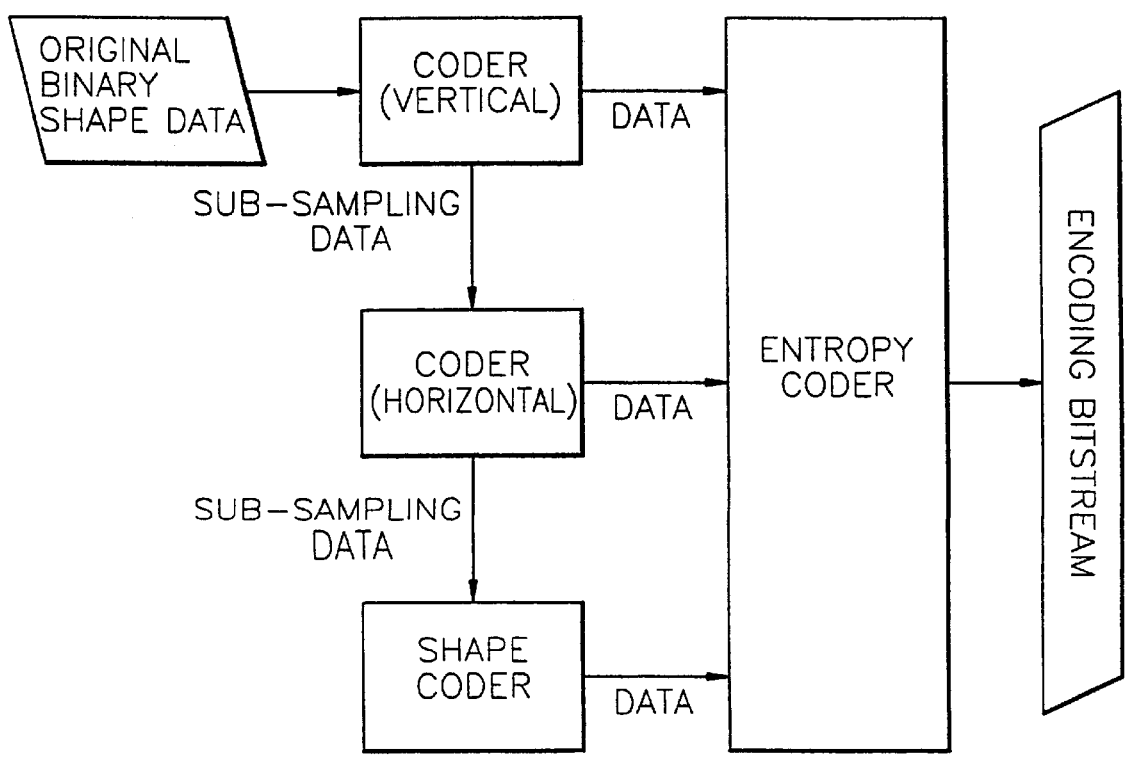

FIG. 7 describes a method of encoding the exclusive-OR information indicated by squares on an enhancement layer;

FIG. 8 is a flow chart describing a method of encoding exclusive-OR information;

FIG. 9 shows picture data for describing a method of encoding case-exception information;

FIG. 10 shows six peripheral pixels with respect to an encoding object pixel Pxy in an original picture;

FIG. 11 shows a one-dimensionally reconstructed pixel context characteristic value with respect to the pixels except for the pixel corresponding to OR information among the pixels of an enhancement layer;

FIG. 12 shows a case-exception information pixel with respect to case-exception information which can be performed without using the methods of FIGS. 9 through 11 and peripheral pixels;

FIG. 13 describes a method for encoding the case-exception information according to the present invention; and FIG. 14 is a block diagram showing an example of encoding according to the order of applying the scan interleaving method.

DESCRIPTION OF THE PREFERRED EMBODIMENT(S)

Figure 1:
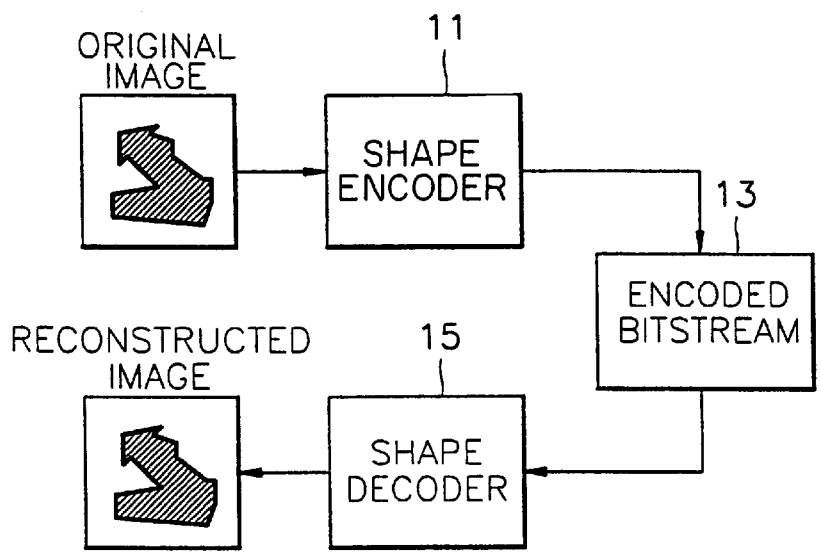
FIG. 1 shows the structure of a general shape encoder.
Figure 2:
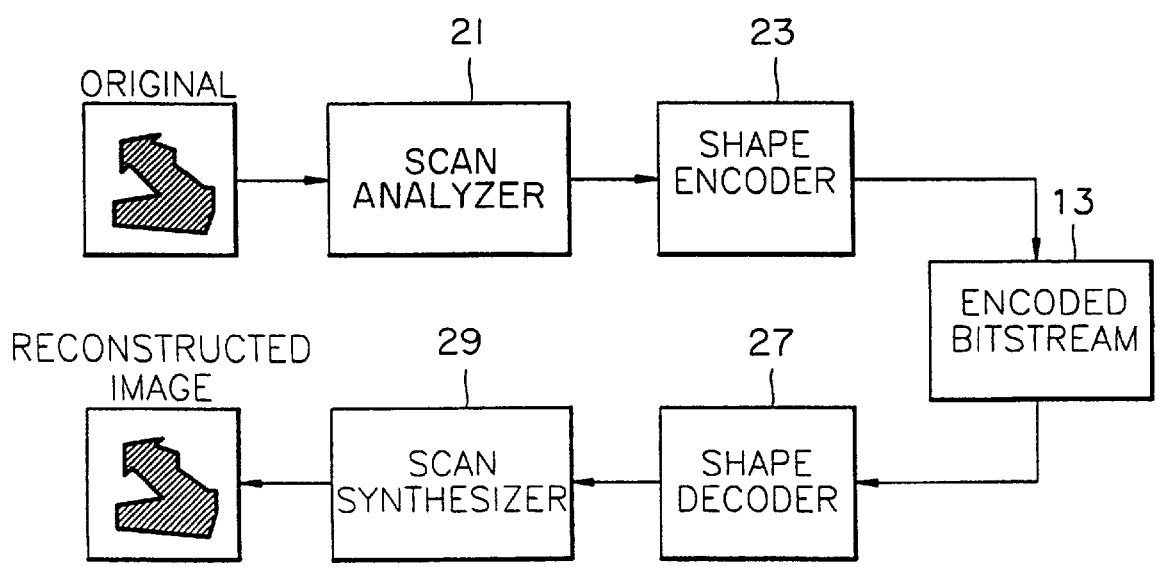
FIG. 2 shows the structure of a shape encoder including a scan analyzer/synthesizer according to the present invention.

Preferred embodiments of the present invention will be described with reference to the attached drawings. FIG. 2 is a block diagram showing the structure of a shape encoder including a scan interleaving analyzer/synthesizer according to the present invention, which includes a scan analyzer 21, a shape encoder 23, a shape decoder 27, and a scan synthesizer 29. A scan interleaving process is performed before encoding is performed and after decoding is performed by inserting the scan analyzer 21 and the scan synthesizer 29 into the shape encoder shown in FIG. 1.

Figure 3:
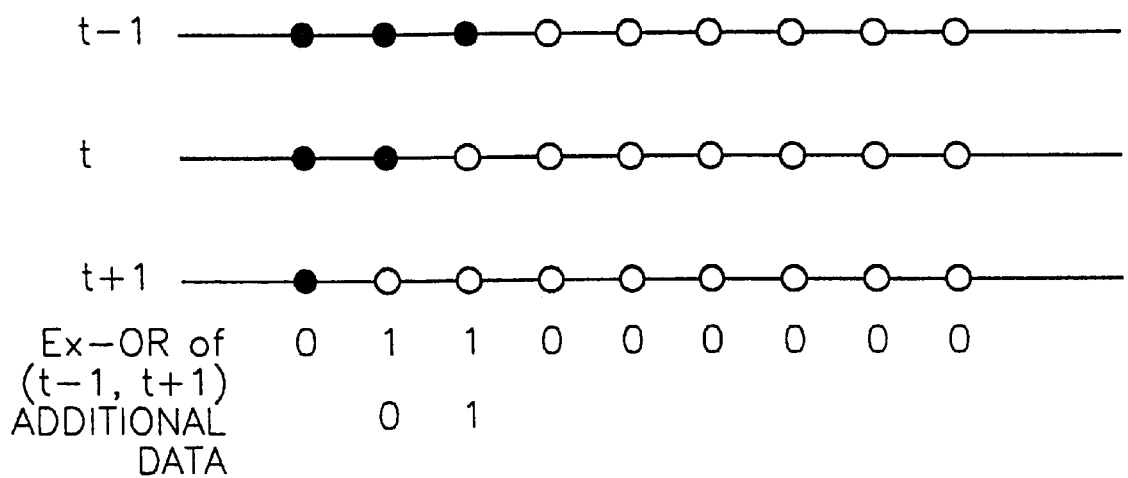
FIG. 3 shows an example of scan interleaving process applied to the present invention.

Referring to FIG. 3, the binary numerical value information of a current scanning line (t) can be obtained by performing an exclusive-OR operation with respect to a previous scanning line (t−1) and a next scanning line (t+1). Namely, the result of performing the exclusive-OR operation becomes '0' in the case that the previous pixel value is equal to the next pixel value. In general, since the current scanning line pixel value is generally equal to the previous and next scanning line pixel value, encoding is not needed. Meanwhile, the pixel value of the current scanning line is encoded only in the case that the current pixel value is different from the previous to next scanning line pixel values. Though very uncommon, if both of the previous and next scanning line pixel values are different from the current scanning line pixel value, such information is to be encoded. The scan interleaving information, the pixel value selected by the exclusive-OR operation, and the values excluded by the exclusive-OR operation are encoded.

Figure 4:
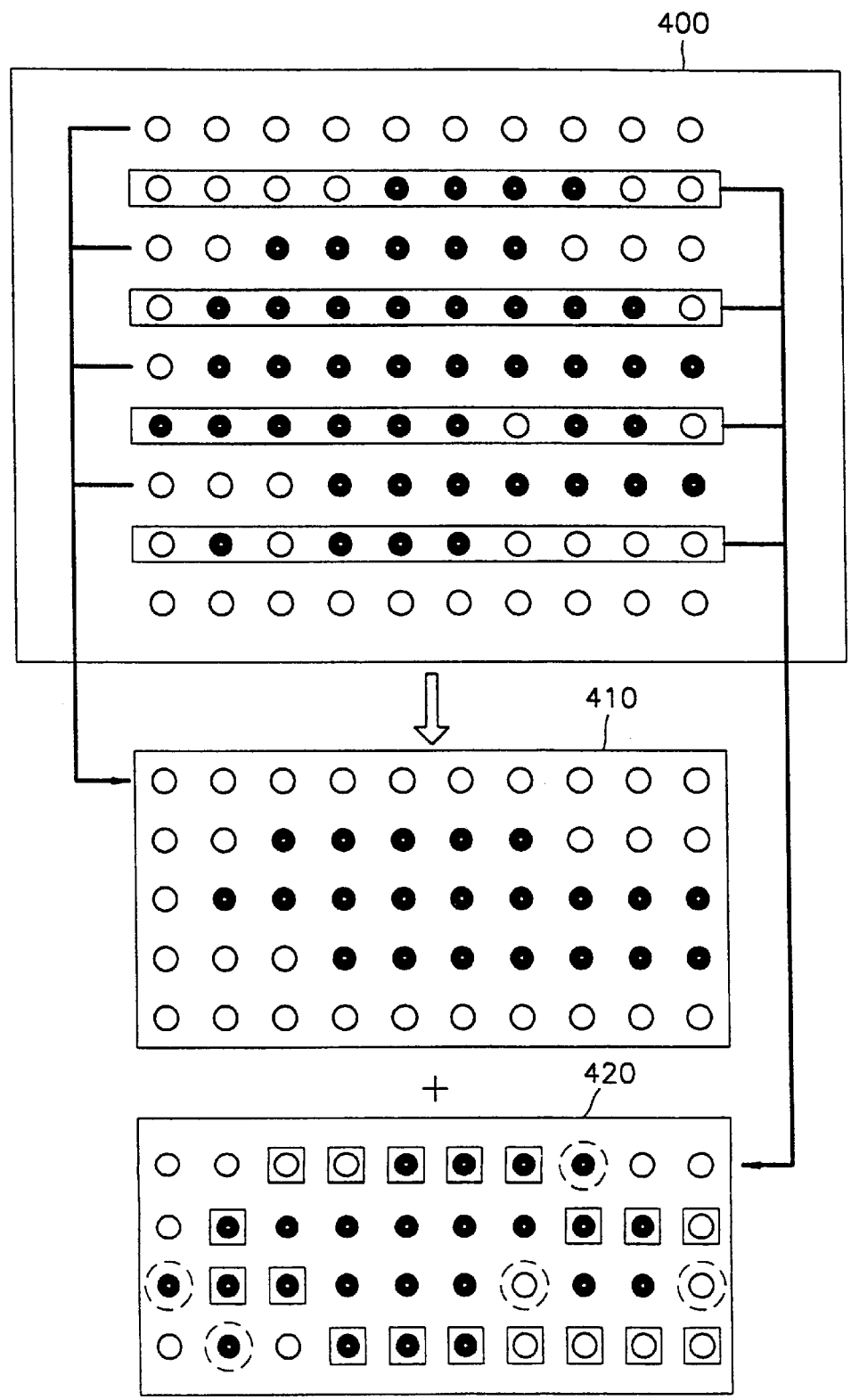
FIG. 4 shows an example for describing a scan interleaving method.

FIG. 4 shows FIG. 3 in greater detail, in which an example for explaining a scan interleaving method is shown. Reference numeral 400 represents the interleaved scanning lines of the binary image data, which is divided into reference numerals 410 and 420. The filled and unfilled circles forming the interleaved scanning lines represent the binary data. For example, the unfilled and filled circles can be respectively indicated as '0' and '1'. The reference numeral 410 represents one (an odd scanning line) among the interleaved scanning lines (hereinafter, an odd scanning line and an even scanning line) forming the binary image data of the reference numeral 400, which is called a base layer. The reference numeral 420 shows an even scanning line among the interleaved scanning lines forming the binary image data of the reference numeral 400, which is called an enhancement layer.

The reference numeral 420 is described in detail as follows. The pixels indicated by squares show a case in which the pixel values of the previous and next scanning lines of the current scanning line are changed with respect to the pixel of the current scanning line when the previous and next scanning lines of the current scanning line in each pixel are compared to each other, namely, the value obtained by performing the exclusive-OR operation with respect to the pixels of the previous and next scanning lines of the current line is '1'. This is called 'exclusive-OR information'. The pixels indicated by dotted circles show a case in which the pixel values of the previous and next scanning lines of the current scanning line are not changed with respect to the pixel of the current scanning line when the previous and next scanning lines of the current scanning line in each pixel are compared to each other, namely, the pixel values of the previous and next scanning lines are different from the pixel value of the current scanning line. This is called 'case-exception information'. Therefore, the enhancement layer 420 is formed of pixel values in which the exclusive-OR information, the case-exception information, the current scanning line and the previous and next scanning lines do not change. This is called OR information.

Figure 5:
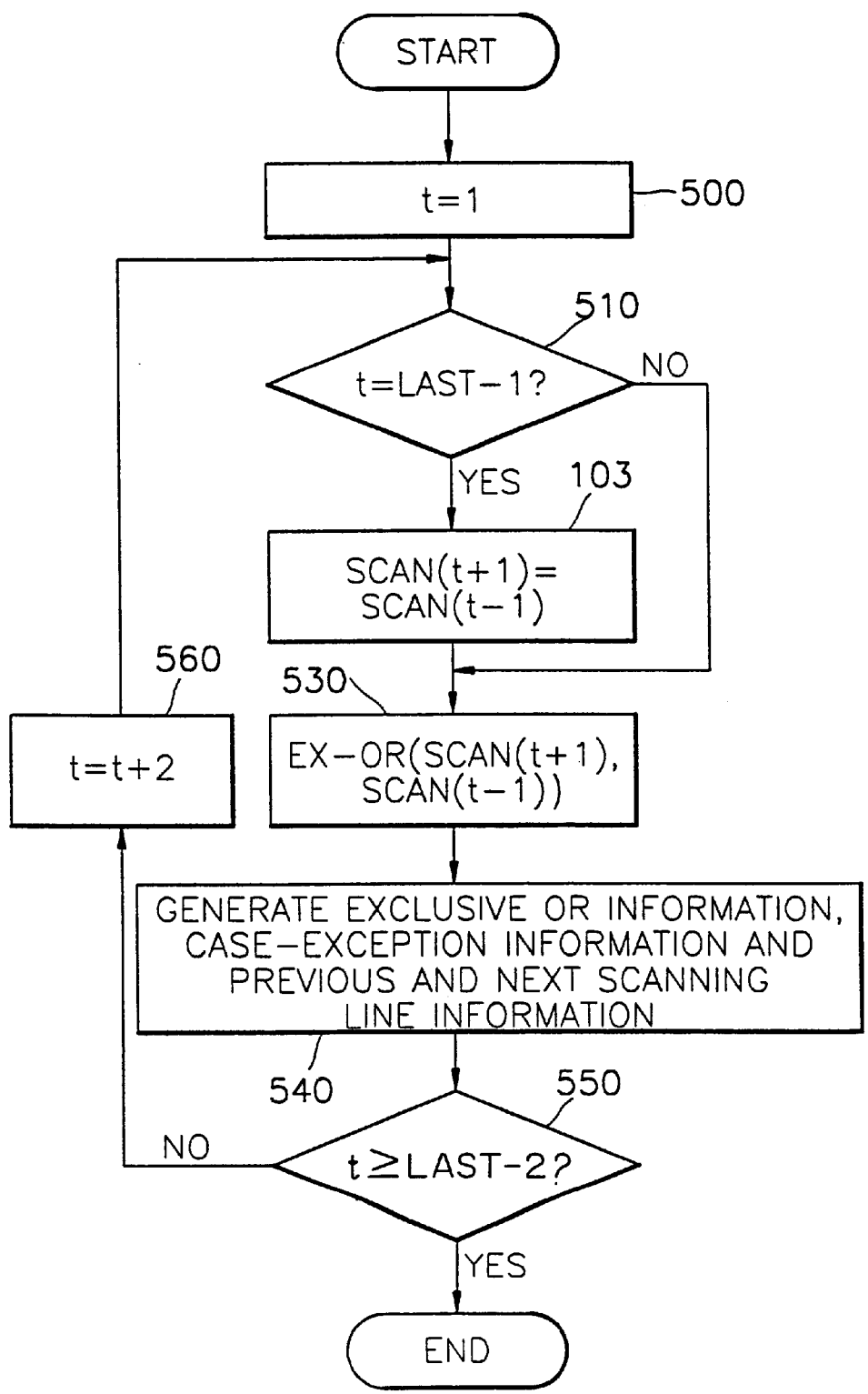
FIG. 5 is a flowchart of a first level scan interleaver according to the present invention.

FIG. 5 is a flow-chart describing the operation of a first level scan interleaver. As shown in FIG. 5, input shape data is initialized with t=1 {t=0, 1, . . . , LAST−1} (step 500). Here, t indicates the position of the current scanning line and LAST denotes the number of the scanning lines. When the initializing process is performed, it is determined whether the current scanning line is the last scanning line of the current frame that is any size of data block (step 510). In the case that the current scanning line is the last scanning line, the (t+1)th scanning line is set to be identical to the (t−1)th scanning line (step 520) and the exclusive-OR operation is performed by the previous scanning lines (step 530). In this case, the pixel values of the case in which the contents of the current scanning line differ from those of the previous scanning line are encoded as additional information (the value excluded from the exclusive-OR operation) during encoding.

When the exclusive-OR operation is performed in the step 530, the case-exception information excluded from the scan interleaving information, the exclusive-OR information, and the scan interleaving information (previous and next scanning line information) is generated (step 540). In the case that the current scanning line is not the last one in the step 510, the process proceeds to step 530. After performing the exclusive-OR operation in the step 530, it is determined whether the current scanning line is the last scanning line (step 550). If the condition is true, the process is terminated. If the condition is false, t is increased by two (step 560) and the step 510 is performed.

Figure 6:
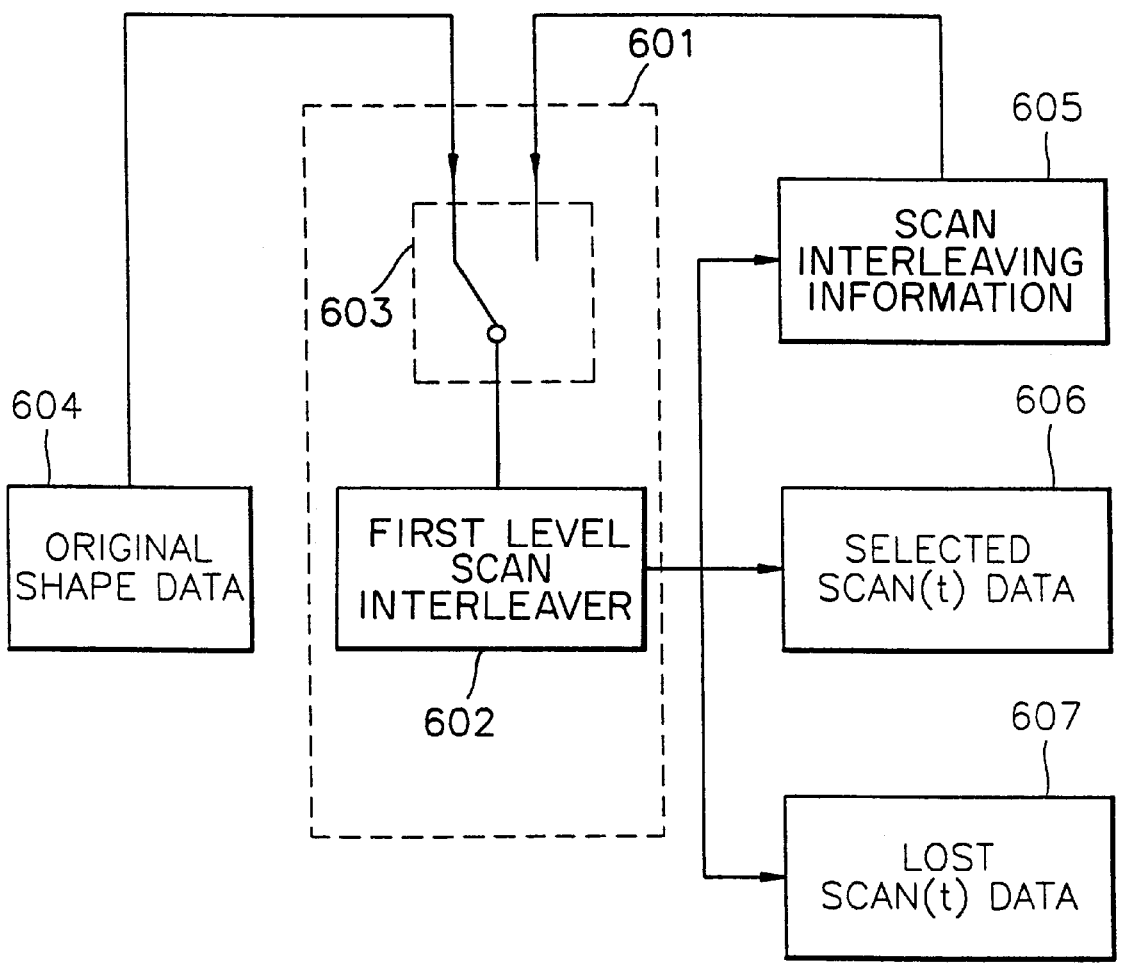
FIG. 6 shows the structure of a multi-level scan interleaver according to the present inention.

FIG. 6 shows a scan interleaver constructed so as to perform a multi-level function by returning the scan interleaving information to an input in the first level scan interleaver whose operation is shown in FIG. 5. Referring to FIG. 6, an original shape data 604 is input to a first scan interleaver 602 through a switch 603, and a scan analysis is performed as shown in FIG. 5. A scan interleaving information 605, a pixel value 606 selected by the exclusive-OR operation, a case-exception information 607 showing the value excluded from the exclusive-OR operation are generated. The scan interleaving information 605 can be fedback to the first level scan interleaver 602 through the switch 603 and input, if necessary. In this way, a multi-level scan interleaving process can be performed. The last generated scan interleaving information 605 is input to the shape encoder 23 of FIG. 2. The pixel value 606 selected by the exclusive-OR operation generated in each level is combined with the case-exception information 607 showing the value excluded from the exclusive-OR operation, thus forming a bitstream.

The scan synthesizing processes in the scan synthesizer (29 of FIG. 2) proceed in a reverse order to the scan analyzing processes of FIG. 4. The scan interleaving information of the previous level is reconstructed using the scan interleaving information of the highest level, the exclusive-OR information showing the pixel value selected by the exclusive-OR operation, and the case-exception information showing the value excluded from the exclusive-OR operation. The scan interleaving information of the previous level is reconstructed using the pixel value selected by the exclusive-OR operation of the level and the value excluded from the exclusive OR operation. Such processes are repeated until the original image is reproduced.

Table 1 shows examples of a case in which the scan interleaving method according to the present invention is used and a case in which the scan interleaving method according to the present invention is not used. Even if the scan interleaving method is added as shown in the table 1, the number of bits do not increase significantly. In the case of the scan interleaving method, since entropy encoding is not used with respect to additional information, the result obtained by the scan interleaving method does not differ much from the result of baseline encoding in which entropy encoding is used. The scan interleaving method provides multiple functions other than a compression effect. However, baseline encoding does not provide multiple functions.

TABLE 1

| Input image | Scan interleaving method + baseline encoding | Baseline encoding only |
| --- | --- | --- |
| Kids | 2087 bits/frame | 2016 bits/frame |

Therefore, since the correlation between scanning lines is high in the case of shape data, it is possible to effectively reduce the amount of encoding of the present scan interleaving pixels by performing the exclusive-OR operation with respect to the previous and next scan interleaving pixels. Namely, as shown in FIG. 3, the information on the nine pixels of the current scanning line may not be represented as nine bits but may be represented by additional information of two bits using only the exclusive-OR operation.

Meanwhile, the scanning lines of a base layer 410 of FIG. 4 are encoded by a conventional method and formed as a bitstream. A more effective method for encoding the exclusive-OR information and the case-exception information of the enhancement layer 420 will be described.

First, the method for encoding the exclusive-OR information will be described. An encoding method, in which the run-length of an equal pixel value is used, is used with respect to the exclusive-OR information indicated by squares in the enhancement layer 420. The encoding method is described in FIG. 7.

In FIG. 7, reference numeral 700 shows the enhancement layer 420 of FIG. 4. The exclusive-OR pixels to be encoded are marked with squares such as reference numeral 710. The pixels can be reconstructed to one dimensional information such as reference numeral 720. In such one dimensional information, pixels having the same values appear continuously. In the present invention, it is possible to improve an encoding bit effect by obtaining the run-length (R1, R2, R3, R4, . . . , Rn) 730 having the same value in the one dimensional arrangement of the exclusive-OR information such as the reference numeral 720 and by encoding the value using an appropriate entropy encoding method.

FIG. 8 is a flowchart showing the method of encoding the exclusive-OR information, which will be described as follows. A predetermined pixel context characteristic value considering the context of peripheral pixel values of the pixel to be encoded is defined with respect to the case-exception information indicated by dotted circles in the enhancement layer 420 and the number of appearances of the information is encoded.

FIG. 9 shows picture data for describing a method of encoding the case-exception information. Reference numeral 900 shows an example of the enhancement layer 420 which is the information to be encoded of FIG. 4 and describes the encoding of the case-exception information in a general case. Reference numerals 904, 906, and 908 in the enhancement layer 900 show that the case-exception information is shown in the coordinates of $(x_1,y_1)$, $(x_{n-1}, y_{n-1})$, and $(x_n, y_n)$ representing the positions in original binary images. In a general case in which the case-exception information does not exist at the edge of the picture, the pixel context characteristic value of the encoding object pixel Pxy in the original picture is obtained considering the context of six peripheral pixels (P1, P2, . . . , P6) and the pixel context characteristic value of the pixel at the edge of the picture is obtained by defining the six peripheral values (P1, P2, . . . , P6) by copying pixels using a predetermined method. The definition of the pixel context characterisitic value in the case shown in FIG. 10 is represented by Equation 1 as follows. The pixel context characteristic value of the pixel Pxy in an optional pixel position (x,y) is represented as F(Pxy) as shown in the Equation 1.
[Equation 1]

$$F(Pxy)=[P1, P2, P3, P4, P5, P6] \ldots \quad (1)$$

wherein, F(Pxy) is the pixel context characterisitic value at a pixel position (x,y) in an arbitrary picture.

Therefore, in order to encode the case-exception information, the pixel context characteristic value is obtained using the Equation (1) with respect to the pixels except for the pixel corresponding to the the OR information among the pixels of the enhancement layer 500 (step 810). In this case, the pixel context characteristic value with respect to the pixel to be scan interleaved such as reference numeral 900 can be one-dimensionally reconstructed as shown in FIG. 7.

Then, the pixel context characteristic value of the case-exception information pixel to be encoded is extracted (step 830). Here, the case-exception information of the initial case-exception information pixel such as reference numeral 904 is encoded by obtaining the number of appearances of the pixel context characteristic value, which is equal to the pixel context characteristic value 130 of the case-exception information 904 among the pixel context characteristic values from the beginning to the pixel context characteristic value 130 of the case-exception information 904 such as the reference numeral 110 of FIG. 11 (step 840), usng an entropy encoding method suitable for the value (step 850). Also, the case-exception information positioned in an arbitrary coordinate (xn,yn) such as reference numeral 908 is encoded by obtaining the number of appearances of the value equal to the pixel context characteristic value 150 of the case-exception information 908 between the pixel context characteristic value 140 of a previous case-exception information 906 and the pixel context characteristic value 150 of the case-exception information 908 (step 840), using an entropy method suitable for the value (step 850).

The encoding of the case-exception information is performed by the following method:

(1) The pixel context characteristic values are obtained using the Equation 1 with respect to the scan interleaved pixels.

(2) The pixel context characteristic values obtained from (1) are one-dimensionally reconstructed.

(3) The pixel context characteristic value in the case-exception information pixel to be encoded is extracted.

(4) The number of appearances of the value equal to the value obtained from (3) between the case-exception information pixel to be encoded and the previously encoded case-exception information pixel.

(5) The number obtained from (4) is encoded using an entropy encoding.

Here, the case-exception information pixel which initially appeared is encoded by the entropy encoding method using the number of appearances from the beginning of scan interleaving to the current pixel since the previously encoded case-exception does not exist. During the encoding of such case-exception information, the case-exception information pixel having peripheral pixels as shown in FIG. 12 can be processed without using the previously described methods of FIGS. 9 through 11.

Another method of encoding the exclusive-OR information will be described. The exclusive-OR information indicated by squares in the enhancement layer 420 is encoded using the pixel context characteristic value, which is shown in FIG. 7. In FIG. 7, reference numeral 700 is the enhancement layer 420 of FIG. 4. The exclusive-OR pixel which is an object to be encoded in this case is indicated by a square like reference numeral 710. In a general case in which these pixels do not exist at the edge of the picture, the pixel context characteristic value of the pixel Pxy to be encoded in the original picture is obtained considering the context of six peripheral pixels (P1, P2, . . . , P6), as shown in FIG. 10. The pixel context characteristic value of the pixel located at the edge of the picture is obtained by defining the six peripheral values (P1, P2, . . . , P6) by copying pixels using a predetermined method. The pixel context characteristic value shown in FIG. 10 is represented by the above Equation 1 and the pixel context characteristic value of the pixel Pxy in an optional pixel position (x,y) is represented as F(Pxy), as shown in formula 1.

Since six peripheral pixel values are used in order to encode one pixel from the Equation 1, 64 probability models can be constructed in each pixel. Therefore, it is possible to obtain the pixel characteristic value using the peripheral pixel information as mentioned above in the exclusive-OR information. The probability model is obtained using the pixel characteristic value and the pixel to be encoded is encoded based on the probability model. The encoding of the exclusive-OR information is performed by the following method. First, when the exclusive-OR information value is 1, the pixel context characteristic value is obtained using the Equation 1. Then, the exclusive-OR information is entropy encoded based on a predetermined probability model based on the obtained pixel context characteristic value.

Another method for encoding the case-exception information will be described as follows. The case-exception information encoding is performed by encoding the pixel context characteristic value, the run of the pixel context characteristic value, and the run of the case exception information pixel. FIG. 9 shows picture data for describing the method of encoding the case-exception information. Reference numeral 900 shows an example of the enhancement layer 420 which is the information to be encoded of FIG. 4. Reference numerals 904, 906, and 908 in the enhancement layer 900 show that the case-exception information is shown in the coordinates $(x_1,y_1)$, $(x_{n-1},y_{n-1})$, $(x_n,y_n)$, which are the positions thereof in the original binary picture. In a general case in which the case-exception information does not exist at the edge of the picture, the encoding of the case-exception information is performed as follows. In a general case in which these pixels do not exist at the edge of the picture, the pixel context characteristic value of the pixel Pxy to be encoded in the original picture is obtained considering the context of six peripheral pixels (P1, P2, . . . , P6), as shown in FIG. 10. The pixel context characteristic value of the pixel located at the edge of the picture is obtained by defining the six peripheral values (P1, P2, . . . , P6) by copying pixels using a predetermined method.

The method for encoding the pixel context characteristic value of the case-exception information encoding and the run of the characteristic value is described in detail with respect to FIG. 8. The described method for encoding the case-exception information is used when the case-exception information is not continuous. The case-exception information is encoded as follows when it is continuous. As shown in FIG. 13, when continuous case-exception information 1300 is shown, the rength of a pixel segment is encoded 1320 instead of continuously encoding the context characteristic value and run of the case-exception information. Here, a segment line is a set of pixels in which the exclusive-OR information (or the case-exception information) is continuously connected when the picture data is encoded and the pixels are marked with one among the exclusive-OR information and the case-exception information. For example, the length of the segment is 5 when the exclusive-OR information is continuously connected in 5 pixels. Reference numeral 1330 is an example of encoding the continuous pixel information 1310. Namely, it is possible to improve the compression effect by obtaining the pixel context characteristic value of the first pixel in order to obtain position information and encoding the continuing pixel using the position information of the first pixel.

During the encoding of the case-exception information, the above-mentioned method is impossible to be used with respect to the case-exception information pixel having the peripheral pixel shown in FIG. 12.

In the case of lossy coding, it is possible to select information to be encoded or information not to be encoded using the length of the segment as a unit. For example, the information whose segment length is more than 5 is encoded and the information whose segment length is less than 5 is not encoded. Here, the segment length is the unit for lossy coding. When the lossy coded data is decoded in a decoder, the data is not decoded when the exclusive-OR information is not greater than the segment length and an estimated value of the segment is filled up. The case-exception information is not processed in the decoder since the case-exception information is encoded after excluding the pixels of not more than the given segment length from the case-exception information. In the case of filling the exclusive-OR information with the estimated value, it is possible to estimate the pixel value of high probability using the probability model shown by the Equation 1.

In the above method, the exclusive-OR information is encoded using the pixel context and a strong correlation of the peripheral pixel context, thus improving the compression effect. In order to effectively apply the scan interleaving method, the number of generated information is measured and the order in which the scan interleaving method is applied is determined on the basis thereof. Namely, in determining whether the interleaved scanning lines are to be horizontal or vertical, the number of generations of the exclusive-OR information and the case-exception information is obtained by applying the interleaved scanning line in the horizontal direction and the number of generations of the exclusive-OR information and the case-exception information is obtained by applying the interleaved scanning line in the vertical direction. Then, the two numbers obtained above are compared and the interleaved scanning line is applied in the direction of fewer exclusive OR generations. There may be layers in the scan interleaving method. Namely, the once applied interleaved scanning line can be applied again. The number of applications of the interleaved scanning line can be determined by the layers. For example, the once applied interleaved scanning line is called a first layer and the interleaved scanning line which is applied again is called a second layer. The direction is flexible according to circumstances. FIG. 14 is a block diagram showing an example of encoding according to the order in which the scan interleaving method is applied. In the figure, the scan interleaving method is applied to input data with a horizontal scanning direction, which is called Vertical Scan Interleaving. And then the scan interleaving method with a vertical scanning direction, which is called Horizontal Scan Interleaving, is applied to the sub-sampled data that is the base layer of the previous scan interleaving method (i.e., Vertical Scan Interleaving, in this case). The sub-sampled data given after successive Vertical Scan Interleaving and Horizontal Scan Interleaving can be encoded by any effective encoding method.

In the case-exception information, pixels are continuously generated in a segment unit in many cases. In order to effectively encode the case-exception information, the length of the pixel segment is encoded whenever the case-exception pixel is encoded.

As mentioned above, in the image or shape encoder according to the present invention, the exclusive-OR operation is performed with respect to the pixels of the previous and next scanning lines with respect to the current scanning line and the pixel of the current scanning line is encoded and transferred only in the case that the pixel values of the previous and next scanning lines are different from each other. Accordingly, encoding processes are very simple, thus improving the compression effect. Also, since the encoding processes are independent, the shape encoder according to the present invention can be combined to any shape encoder.

Also, since a main operation is the exclusive-OR operation which is very simple and fast, the shape encoder according to the present invention is advantageous with respect to price, performance, and speed, and picture quality can be easily controlled thereby. Also, an effective compression can be performed without performing an entropy encoding with respect to additional information. Accordingly, the shape encoder according to the present invention is advantageous in communications situations in which a transfer error is considerable.

In particular, the exclusive-OR information is one-dimensionally reconstructed and the run-length of the identical value is encoded using an appropriate entropy encoding. Also, the case-exception information is one-dimensionally reconstructed by obtaining the pixel context characteristic value with respect to each pixel which is scan interleaved in a binary picture. The number of appearances of the value equal to the pixel context characteristic value of the current case-exception information pixel among the pixel context characteristic values between the previous case-exception information of an optional case-exception information and the present case-exception information is encoded using the entropy encoding. Accordingly, the encoding processes are very simple, thus improving the compression effect.

Also, the exclusive-OR information and the case-exception information are entropy encoded according to a probability model by defining the pixel context characteristic value considering the context of the peripheral pixel value of the pixel to be encoded and obtaining the pixel context characteristic value with respect to each pixel which is scan interleaved in the binary picture. In particular, an additional compression effect is generated by encoding the run for processing pixels in a segment unit during processing of the case-exception information. The compression effect improves by considering the order in which the scan interleaving method is applied and the lossy coding.

What is claimed is:

1. A method for encoding an image, comprising the steps of:
    determining whether pixels of a present scanning line in a predetermined frame, being any size of input data block, of an image sequence should be encoded according to comparison results (1) between pixels of a previous scanning line and pixel of a next scanning line and (2) between pixel of a previous or next scanning line and pixel of the current scanning line; and
    encoding pixels of lines of said frame excluding pixels that are determined not to be encoded.

2. A method for encoding an image as claimed in claim 1, wherein said pixels are determined to be different from each other by performing an exclusive-OR operation.

3. A method for encoding an image as claimed in claim 2, wherein said step of determining the difference between pixels comprises the steps of:
    dividing picture data into data of a scan interleaving pattern in a predetermined frame of an image sequence; and
    performing an exclusive-OR operation with respect to the respective pixels of the previous and next scanning lines of the current scanning line in said frame.

4. A method for encoding picture data as claimed in claims 2 or 3, wherein the exclusive-OR operation is performed by replacing said next scanning line with said previous scanning line in the case that said current scanning line corresponds to the last scanning line in said frame.

5. A method for encoding picture data as claimed in claim 3, wherein said step of performing the exclusive-OR operation and said step of generating data are performed at least once with respect to said previous and next scanning lines by inputting the previous and next scanning line information of said current scanning line in order to process multi-level scanning lines.

6. A method for encoding an image as claimed in claim 3, wherein said step of encoding the image comprises the steps of:
    generating previous and next scanning line information of said current scanning line, the resultant value (exclusive-OR information) of the exclusive-OR operation between the pixel of previous scan line and the pixel of next scan line corresponding to each pixel of said current scanning line, and the case-exception information of the current scanning line, which mean the pixel value of said current scanning line is different from the pixel value of previous and next scanning line, though the pixel values of the previous and next scanning lines of which are the same; and
    encoding the previous and next scanning line information of said generated current scanning line which forms a bitstream and encoding the pixel which is included in exclusive-OR information and case-exception information, and combining the same with said formed two bitstreams, to thereby form the complete bitstream.

7. A method for encoding picture data as claimed in claim 6, wherein encoding of the pixel which is included in the exclusive-OR information of said step of forming a bitstream comprises the steps of:
    obtaining the run-length of the pixels from successive exclusive-OR data which have the same value of current encoded pixel; and
    encoding said obtained run-length using a predetermined entropy encoding method.

8. A method for encoding picture data as claimed in claim 6, wherein the encoding of the exclusive-OR information in said step of forming the bitstream comprises the steps of:
    obtaining a pixel context characteristic value determined according to a predetermined peripheral pixel value with respect to the pixels except for the pixel corresponding to said exclusive-OR information among the pixels of the scanning lines including said exclusive-OR information and said case-exception information among the scanning lines divided in said step of dividing the scanning line;
    mapping said obtained pixel context characteristic value by an established probability model value; and
    encoding the value mapped by said probability model value by a predetermined entropy encoding method.

9. A method for encoding picture data as claimed in claim 6, wherein the encoding of the case-exception information in said step of forming the bitstream comprises the steps of:
    obtaining the pixel context characteristic value determined according to a predetermined pixel value with respect to each pixel except for the pixel corresponding to said exclusive-OR information among the pixels of the interleaved scanning lines including said exclusive-OR information and said case-exception information among the scanning lines divided in said step of dividing the interleaved scanning lines;
    one-dimensionally reconstructing said obtained pixel context characteristic value;
    extracting the pixel context characteristic value of the case-exception information pixel to be encoded;
    obtaining the number of appearances of the value equal to said extracted pixel context characteristic value between the case-exception information pixel to be encoded and the previously encoded case-exception information pixel; and encoding the subtracted pixel context characteristic value and said obtained number by a predetermined entropy encoding method.

10. A method for encoding picture data as claimed in claim 6, wherein encoding of the case-exception information in said step of forming the bitstream comprises the steps of:

dividing pixels except for the pixel corresponding to said exclusive-OR information among the pixels of the interleaved scanning lines including said exclusive-OR information and said case-exception information among the interleaved scanning lines divided in said step of dividing the interleaved scanning lines in successive case-exception information segment unit;

obtaining the pixel context characteristic value determined according to a predetermined peripheral pixel value with respect to the first pixel of said segment;

one-dimensionally reconstructing said obtained pixel context characteristic value and the length of the segment which include said obtained pixel for each segment in a segment unit;

obtaining the number of appearances of the value equal to said obtained pixel (the first pixel of each segment) context characteristic value between the case-exception information pixel to be encoded and the previously encoded case-exception information pixel; and encoding said obtained pixel context characteristic value, said obtained number and said obtained length of the segment which include said obtained pixel as first pixel by a predetermined entropy encoding method.

11. A method for encoding picture data as claimed in claims 8 or 10, further comprising a lossy coding step of selecting information to be coded or information not to be coded by the segment length.

12. A method for encoding picture data as claimed in claims 8 or 10, further comprising the step of measuring the number of generated information or the number of generated bits and determining the order in which the scan interleaving method is to be applied on the basis of number.

13. A method for encoding picture data as claimed in claim 12, wherein said scanning interleaving method can be applied to the picture data which is given after previous scanning interleaving method.

14. An apparatus for encoding picture data, comprising:

a scan analyzer for analysing a current scanning line using the exclusive-OR with respect to the pixel of the concerned line of the previous and next scanning lines of the pixel of the concerned line of the current scanning line in a predetermined frame of an input picture, forming the previous and next scanning line information of said present scanning line, the pixel value selected by said exclusive-OR operation, the pixel value excluded from said exclusive-OR operation, and the pixel value of case-exception information, and repeatedly performing the scan analysis with respect to the previous and next scanning lines of said current scanning line as much as the concerned number of stages;

an encoder for encoding the previous and next scanning line information of said finally generated current scanning line after performing the scan analysis as much as said concerned number of stages and forming it as a bitstream and joining the bitstream of the pixel selected by said exclusive-OR operation generated in each difference and the pixel excluded from said case-exception operation to said bitstream;

a decoder for decoding a bitstream output from said encoder; and a scan synthesizer for performing the processes of reconstructing the previous and next scanning line information of current stage using one stage lower decoded picture and then the current scan line of current stage can be given from the exclusive-OR information and case-exception information which are decoded from the bitstream.

15. A method for encoding picture data as claimed in claim 5, wherein the scan interleaving method with horizontal scanning direction and vertical scanning direction can be successively applied.

* * * * *